Patented Aug. 22, 1939

2,170,158

UNITED STATES PATENT OFFICE 2,170,158

METHOD OF DECARBONIZING A CARBON HOLDING METAL, FOR INSTANCE PIG IRON

Ivar Rennerfelt, Djursholm, Sweden

No Drawing. Application October 28, 1936, Serial No. 108,012. In Sweden November 4, 1935

12 Claims. (Cl. 75—28)

REISSUED

JUL 2 - 1940

My invention relates to improvements in methods for producing for instance soft iron particles to be used principally as a substitute for ordinary high grade low carbon scrap iron when making steel in open hearths and electric furnaces. The invention has for its objects: first, to provide a cheap method suitable for decarbonizing ordinary or high grade white or gray pig iron; second, to provide a method for eliminating at least a substantial part of the sulphur present in the pig iron; third, to provide a simple and rational method for decarbonizing pig iron at a temperature lower than the melting point; fourth, to provide a decarbonizing method that may be conveniently carried out in any one of a considerable number of heating furnaces of well known types; fifth, to facilitate the production of high grade steel or alloys of uniform quality by supplying a high grade soft iron of uniform quality, available in abundant quantities; sixth, to provide a method adapted also for decarbonizing metals and alloys in general.

The several objects of my invention are attained by first subdividing the carbon holding metal such as white or gray pig iron into more or less hollow granules, grains, a fine powder or thin flakes by means of mechanical crushing and grinding or by exposing the iron when in a liquid state to the action of water, air or steam. This may be done by pouring the iron into a pool of water or by blowing air or steam onto a jet of iron flowing from a furnace or a ladle. To obtain the iron in the shape of thin flakes it might be poured onto an iron bed or on rotating rollers which may be cooled in any suitable manner.

The finely subdivided iron is then exposed to the action of solid or gaseous oxydants at a temperature between 750° and 1100° C. or thereabout, preferably in the neighbourhood of 1000° C. The solid oxydant may consist of an iron ore, for instance hematite, purple ore, magnetite, an iron carbonate or an iron hydroxide. One may also use a carbonate for instance of lime, which is split up into $CO_2$ and CaO at about 1000° C.

If employing oxidizing gases, these may consist of $CO_2$ or air or of a mixture of $CO_2$ and CO in suitable proportions, for instance 25% $CO_2$ and 75% CO which will greatly facilitate the oxidizing of the carbon without oxidizing the iron. In the case of decarbonizing by means of gases, which might be free from nitrogen, one can mix the iron particles with a neutral material, for instance sand, crushed quartz, a powder of lime or limestone or even with an iron ore. The addition of a neutral material such as lime or quartz will counteract any tendency of the metal particles to sinter or stick together. If decarbonizing by means of iron ore this should be in the shape of a fine powder in order to cause a very intimate contact between the oxydant and the small iron particles, thus facilitating a quick and far reaching decarbonizing, for instance to 0.1% and less in a couple of hours. To facilitate still more the removal of carbon the charge may be kept in slow motion by rotating the furnace in which it is heated or by means of scrapers or other stirring means in case of a stationary furnace being employed.

When required for certain reasons, for instance for decarbonizing FeCr or FeMn, etc., one may introduce hydrogen gas or steam into the charge and one may also cause it to be heated in vacuo, preferably in a high frequency furnace in order to facilitate the splitting up of for instance a carbide of Cr or Mn, which are much more stable than the cementite of iron. The method comprises also the method of briquetting the raw materials if so desired.

The soft iron particles obtained may also be compressed into briquettes to facilitate shipping to other places. In such briquettes other metals such as Cr, Mn, W, V, Mo, Ni and Co may be added in the shape of grains or powder so as to provide alloys when melted later on in an electric or other furnace.

By adding a considerable excess of an easily reducible iron ore and using a reducing gas, for instance $H_2$ or CO, preferably at the end of the decarbonizing period, one may obtain a corresponding increase of iron without any substantial increase of the expenses, thus reducing the cost per ton of soft iron produced. By the addition of a basic material such as lime or milk of lime or lime stone a substantial amount of the sulphur, which might be present in the charge, will be transformed to CaS, which may be removed in any suitable way. It is possible that also phosphorus, which may be present as a phosphide of iron, may be removed in the same way.

If the soft iron obtained is mixed with another solid matter, for instance coarse sand or an excess of ore, a division may be obtained by sifting, screening, vibration on a suitable surface, by centrifugal operations or in a magnetic separator. Before heating the iron particles they may be classified according to their sizes so as to facilitate a uniform and quick decarbonizing process.

The heating operation may be performed in several types of furnaces having electrical or other means for heating. One might for instance employ a rotating tubular furnace of the slightly inclining type having burners for internal heating by means of oil, gas or coal powder. One may also heat the charge by means of an electric current using the charge as a resistance in well known manner. The specific resistance of the charge may be controlled by adding more or less of a neutral material such as lime or quartz etc. The charge may also be heated by heat radiating from a resistance or an electric arc inside of the furnace, for which purpose electrodes are inserted in proper way. Another way of heating consists in using a tunnel furnace of the type used for making malleable iron castings or for roasting iron ore briquettes charging the materials in open or covered hearths on top of cars, which are gradually heated by the furnace gases when travelling along the furnace tunnel. Decarbonizing may also take place by heating the materials in annealing pots or boxes in the normal type of stationary annealing furnaces employed in the malleable iron industry.

Even a coking furnace of the retort or chamber type may be employed for decarbonizing according to the invention. Decarbonizing may also be effected in a furnace of the pyrite roasting type in which the charge is travelling in counter current to a flow of hot gases or in a kiln for firing bricks having a plurality of chambers arranged in well known manner. One may, naturally, also use any kind of electric annealing furnaces heating the materials in pans or boxes or other receptacles of heat resisting alloys.

When using the method for decarbonizing other metals than pig iron it may be advisable to use other solid oxydants than stated in the case of iron. One might also find it useful to increase the temperature considerably in the case of decarbonizing FeCr and FeMn.

Regarding the scope of my invention and the means for successfully carrying it out in the practise I do not want to limit myself in any certain way and having now fully described my invention what I do claim and desire to secure by Letters Patent of the United States of America is:

1. A method of producing low carbon iron grains, consisting in heating a charge of small iron granules, obtained by rapidly cooling molten iron in a cooling fluid, while stirring the charge by revolution in a combustion zone the atmosphere of which, containing $CO_2$- and CO-gas, is suitably composed for oxidizing substantially only the carbon but not the iron of the granules, the heating being sufficient for decarbonizing the granules but insufficient for causing them to melt.

2. In a method according to claim 1, heating the charge of granules in a combustion zone, the atmosphere of which contains at the most 25% $CO_2$ and at least 75% CO.

3. A method of producing low carbon iron grains, consisting in heating a charge of a mixture of small iron granules, obtained by rapidly cooling molten iron in a cooling fluid, and an easily reducible iron ore in a finely divided state, while stirring the charge by revolution in a combustion zone the atmosphere of which, containing $CO_2$- and CO-gas, is suitably composed for oxidizing substantially only the carbon but not the iron of the granules, the heating being sufficient for decarbonizing and reducing the charge without melting it, a gas suitable for reducing the iron ore being introduced at the end of the decarbonizing period.

4. A method of producing low carbon grains of an iron alloy, consisting in heating a charge of small granules of the alloy, obtained by rapidly cooling molten alloy in a cooling means, while stirring the charge by revolution in a combustion zone the atmosphere of which, containing $CO_2$- and CO-gas, is suitably composed for oxidizing substantially only the carbon but not the medals of the granules, the heating being sufficient for decarbonizing the granules but insufficient for causing them to melt.

5. A method of producing low carbon iron grains which comprises subdividing iron into small rounded granules by rapidly cooling it while in liquid state, introducing the granules into a tubular, slightly inclining furnace, stirring the charge by rotating the furnace, heating the particles sufficiently for decarbonizing but below the melting point in an atmosphere containing a mixture of $CO_2$- and CO-gas suitable for oxidizing only the carbon but substantially not the iron of the granules and producing the hot decarbonizing atmosphere by means of internal combustion in the furnace.

6. In a method according to claim 5, diminishing the concentration of the CO-gas in the furnace atmosphere by introducing at least one of the diluting gases $N_2$, $H_2$ and $H_2O$.

7. A method of producing low carbon iron grains which comprises a subdivision of the iron into small rounded granules by rapidly cooling it while in a liquid state, introducing them into a tubular, slightly inclining furnace, stirring them by rotating the furnace and heating the charge in an atmosphere of hot gases, produced by internal combustion of a fuel, said atmosphere containing a mixture of at most 25% $CO_2$ and 75% CO, substantially without oxidizing the iron.

8. A method of producing low carbon iron granules which comprises the heating of rounded granules of iron, obtained by rapidly cooling liquid iron, in a rotating, tubular, internally heated furnace, raising the temperature of the granules sufficiently for decarbonizing but below the melting point while causing the charge to be stirred and to move in a direction opposite to that of a flow of gases composed of $CO_2$ and CO and at least one of the diluting gases $N_2$, $H_2$ and $H_2O$ and preventing a substantial oxidizing of the iron by a suitable control of the proportions between the $CO_2$- and CO-gas of the furnace atmosphere.

9. A method of producing low carbon iron granules which comprises the heating and stirring of a mixture of rounded granules of iron, obtained by rapidly cooling molten iron, and an easily reducible iron ore in a finely divided state in a rotating, slightly inclining, tubular and internally heated furnace in an atmosphere capable of decarbonizing the granules at a temperature below the melting point and then in a reducing atmosphere for producing iron from the ore component of the charge.

10. A method of producing low carbon iron grains which consists in heating granules of iron produced by rapidly cooling liquid metal together with a basic material sufficiently for decarbonizing them but below the melting point in an atmosphere containing at least the gases $CO_2$ and CO in such proportions that substantially only carbon and sulphur are removed from the iron grains which are otherwise practically unchanged.

11. A method of producing low carbon iron grains which consists in granulating the iron by rapid cooling, classifying the granules according to their sizes and then heating a graduated class of granules by itself sufficiently for decarbonizing it but below the melting point in an atmosphere of gases containing at least the gases $CO_2$ and CO in a proportion suitable for oxidizing substantially only the carbon but not the iron itself.

12. In a method according to claim 10, heating the mixture of granules of iron and basic material in a rotating, inclining tubular furnace.

IVAR RENNERFELT.